United States Patent
Taomoto et al.

(10) Patent No.: US 9,409,819 B2
(45) Date of Patent: Aug. 9, 2016

(54) WATER REPELLENT SAND MIXTURE AND WATER REPELLENT SAND STRUCTURE

(71) Applicant: PANASONIC CORPORATION, Osaka (JP)

(72) Inventors: Akira Taomoto, Kyoto (JP); Norihisa Mino, Osaka (JP); Shoichi Kiyama, Kyoto (JP); Akira Murakami, Kyoto (JP); Toshihiko Kawachi, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/567,605

(22) Filed: Dec. 11, 2014

(65) Prior Publication Data
US 2015/0090160 A1    Apr. 2, 2015

Related U.S. Application Data (63) Continuation of application No. PCT/JP2013/005539, filed on Sep. 19, 2013.

(30) Foreign Application Priority Data

Sep. 24, 2012    (JP) .................. 2012-209205

(51) Int. Cl.
C04B 111/27    (2006.01)
C04B 14/06    (2006.01)
(Continued)

(52) U.S. Cl.
CPC ............. *C04B 14/06* (2013.01); *A01G 9/1086* (2013.01); *A01G 31/001* (2013.01); *C04B 28/02* (2013.01); *C04B 2103/46* (2013.01);
(Continued)

(58) Field of Classification Search
CPC .................. C04B 14/06; C04B 28/00; C04B 2111/00051
See application file for complete search history.

(56) References Cited

U.S. PATENT DOCUMENTS

2004/0226482 A1* 11/2004 Johansen, Jr. .......... C04B 7/246
106/712
2005/0000392 A1    1/2005 Kikuchi et al.
(Continued)

FOREIGN PATENT DOCUMENTS

JP    54-11931 A    1/1979
JP    2-15503 A    1/1990
(Continued)

OTHER PUBLICATIONS

Klayko, Branden. "Broadly Speaking, Old Veil, New Twist". Jan. 17, 2011. Retrieved from http://blog.archpaper.com/2011/01/broadly-speaking-old-veil-new-twist/#.Vexhdk2FOEA.*
(Continued)

*Primary Examiner* — Kaj K Olsen
*Assistant Examiner* — Karam Hijji
(74) *Attorney, Agent, or Firm* — McDermott Will & Emery LLP (57) ABSTRACT

A water repellent sand mixture includes at least water repellent sand and cement at a weight ratio of 2% or more and 5% or less relative to the water repellent sand. The mixture achieves condensation between the water repellent sand particles by the hydration reaction of the cement, which improves dynamic stability. The mixture can be kept in a block shape due to such improved dynamic stability, water repellency, and less slidable surfaces of the sand particles.

19 Claims, 3 Drawing Sheets

(51) Int. Cl.
  *C04B 28/02* (2006.01)
  *A01G 9/10* (2006.01)
  *A01G 31/00* (2006.01)
  *E02B 3/12* (2006.01)
  *C04B 103/46* (2006.01)

(52) U.S. Cl.
  CPC ............ *C04B 2111/27* (2013.01); *E02B 3/123* (2013.01); *Y02P 60/216* (2015.11)

(56) References Cited

U.S. PATENT DOCUMENTS

| | | | |
|---|---|---|---|
| 2006/0272550 A1* | 12/2006 | Szymanski | C04B 14/02 106/661 |
| 2007/0266906 A1* | 11/2007 | Garcia | C04B 22/0026 106/817 |
| 2011/0311740 A1 | 12/2011 | Mino | |
| 2012/0037045 A1* | 2/2012 | Fonollosa | C04B 28/04 106/709 |

FOREIGN PATENT DOCUMENTS

| | | |
|---|---|---|
| JP | 2-15503 B2 | 4/1990 |
| JP | 4-114979 A | 4/1992 |
| JP | 4-362052 A | 12/1992 |
| JP | 6-335323 A | 12/1994 |
| JP | 10-101396 A | 4/1998 |
| JP | 2005-22913 A | 1/2005 |
| JP | 2006-282415 A | 10/2006 |
| WO | 2010/100819 A1 | 9/2010 |

OTHER PUBLICATIONS

English Translation of International Search Report issued in International Application No. PCT/JP2013/005539 mailed Dec. 10, 2013.
English Translation of International Preliminary Report on Patentability issued in International Application No. PCT/JP2013/005539 mailed Apr. 2, 2015.
English Translation of International Search Report issued in International Application No. PCT/JP20131005539 mailed Dec. 10, 2013.

\* cited by examiner

WATER REPELLENT SAND MIXTURE AND WATER REPELLENT SAND STRUCTURE

CROSS-REFERENCE TO RELATED APPLICATIONS

This is a continuation application of International Application No. PCT/JP2013/005539, with an international filing date of Sep. 19, 2013, which claims priority of Japanese Patent Application No.: 2012-209205 filed on Sep. 24, 2012, the content of which is incorporated herein by reference.

TECHNICAL FIELD

The technical field relates to a water repellent sand mixture, as well as to a water repellent sand structure, each having water repellency and strength at or above a certain level.

BACKGROUND ART

Water repellent treatment techniques for construction materials to date have been developed under ordinary concrete or mortar molding blend conditions and have targeted improvement in water repellency of airtight structures.

A prior patent closely related to the present disclosure on a water repellent technique for solid mortar or concrete with less porosity discloses development of an aqueous organic silicon-based composition serving as a permeable water absorption preventive material (Patent Literature 1). There has been also developed mortar or a concrete composition that is mainly made of a calcareous raw material and a siliceous raw material with adding a silicone oil, causes no deterioration in strength, and has excellent water repellency (Patent Literature 2). Prior patents on application of water repellent treatment to the surface of a sand aggregate for mortar or cement disclose use of waterproof mortar (Patent Literature 3) and a method of producing a highly strong cement hardened body (Patent Literature 4).

CITATION LIST

Patent Literatures

Patent Literature 1: Japanese Unexamined Patent Publication No. 4-114979
Patent Literature 2: Japanese Unexamined Patent Publication No. 2005-22913
Patent Literature 3: Japanese Examined Patent Publication No. 2-15503
Patent Literature 4: Japanese Unexamined Patent Publication No. 54-11931

SUMMARY OF THE INVENTION

For improvement of farm soil or construction of civil engineering works such as roads and the like, water repellent sand has better water repellency and enables formation into any shapes as compared to a water repellent block. It is, however, difficult to keep the shape of water repellent sand formed into a slant or vertical shape because water repellent sand has small surface friction and easily causes a slide.

One non-limiting and exemplary embodiment provides a water repellent sand mixture and a water repellent sand structure having water repellency and strength at or above a certain level.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A water repellent sand mixture comprising water repellent sand and cement, wherein the cement has a weight ratio of 2% or more and 5% or less relative to the water repellent sand.

In another general aspect, the techniques disclosed here feature: A water repellent sand structure composed of the water repellent sand mixture according to the above aspect, wherein the structure stands from an installation surface.

These general and specific aspects may be implemented using a system, a method, and a computer program, and any combination of systems, methods, and computer programs.

The water repellent sand mixture and the water repellent sand structure according to the above aspects, each have water repellency and strength at or above a certain level.

BRIEF DESCRIPTION OF THE DRAWINGS

These and other aspects and features of the present disclosure will become clear from the following description taken in conjunction with the embodiments thereof with reference to the accompanying drawings, in which.

DETAILED DESCRIPTION

Examples of the disclosed technique are as follows.

1st aspect: A water repellent sand mixture comprising water repellent sand and cement, wherein the cement has a weight ratio of 2% or more and 5% or less relative to the water repellent sand.

According to the above aspect, the water repellent sand mixture has water repellency and strength at or above a certain level.

2nd aspect: The water repellent sand mixture according to the 1st aspect, wherein the water repellent sand composed of particles having surfaces processed by water repellent treatment, and the water repellent sand particles have an average diameter of 50 μm or more and 500 μm or less.

3rd aspect: The water repellent sand mixture according to the 1st or 2nd aspect, further comprising: sand not processed by water repellent treatment.

4th aspect: The water repellent sand mixture according to any one of the 1st to 3rd aspects, wherein the mixture has a porosity of 39% or more and 46% or less.

According to the aspects, the obtained water repellent sand mixture as condensate more reliably achieves both water repellency and dynamic stability as well as has excellent air permeability.

5th aspect: The water repellent sand mixture according to any one of the 1st to 4th aspects, wherein the cement is located between the water repellent sand particles and binds the water repellent sand particles to each other.

According to this aspect, the cement binds the plurality of water repellent sand particles to each other and the obtained mixture can have high dynamic stability.

6th aspect: A water repellent sand structure composed of the water repellent sand mixture according to any one of the 1st to 5th aspects, wherein the structure stands from an installation surface.

According to this aspect, the obtained structure can be provided that is composed of the mixture that achieves both water repellency and dynamic stability.

7th aspect: A water repellent sand structure having a lower surface and a side surface, wherein the structure is composed of a mixture of water repellent sand and cement, the cement has a weight ratio of 2% or more and 4% or less relative to the water repellent sand, and when the weight ratio relative to the water repellent sand is denoted by x and an angle formed between the lower surface and the side surface is denoted by y, the angle y satisfies $0 < y \le 2.15x^2 - 9.35x + 43.3$.

8th aspect: A water repellent sand structure having a lower surface and a side surface, wherein the structure is composed of a mixture of water repellent sand and cement, the cement has a weight ratio of 5% or less relative to the water repellent sand, and when the structure is 10 m or less in height or is more than 10 m in height, a height of the structure is denoted by h, and an angle formed between the lower surface and the side surface is denoted by y, the angle y satisfies $0 < y \le 1.08h^2 - 30.99h + 273.81$.

The water repellent sand structure according to the 7th or 8th aspect may be composed of only the water repellent sand mixture according to any one of the 1st to 5th aspects. Alternatively, the water repellent sand structure according to the 7th or 8th aspect may be constructed so that the water repellent sand mixture according to any one of the 1st to 5th aspects is exposed on a surface of at least a part of the structure.

Hereinafter, embodiments of the present disclosure will be described with reference to the drawings.

Terms used in this description are initially described.

The term "water repellent sand" indicates a particle (sand particle) having a surface processed by water repellent treatment. A particle processed by water repellent treatment is also referred to as "water repellent sand". The term. "water repellency" indicates having a contact angle equal to or more than 90 degrees with liquid.

(Finding)

Finding of the present disclosure is described next. The present inventors consider improvement of farm soil or construction of roads using water repellent members. Conventional water repellent members include a highly strong material (e.g. mortar) disclosed in Patent Literature 1. It is difficult to deform a predetermined shape of such a highly strong material.

Improvement of farm soil or construction of roads requires deformation of the water repellent member according to an applied place. Its specific configuration is to be described later.

The present inventors have tried to provide a member that has water repellency as well as is easily deformed by using water repellent sand. In general, accumulated sand can keep a constant shape when the sand includes liquid. Water repellent sand, however, repels liquid. Accumulated water repellent sand easily collapses and it is difficult to keep the shape of the accumulated water repellent sand.

The present inventors have found, through intensive researches, as to water repellent sand and cement, that a water repellent sand mixture having a predetermined weight ratio has water repellency and strength enough to keep a constant shape.

Embodiments of the present disclosure will now be described with reference to the drawings.

First Embodiment

Figure 1:
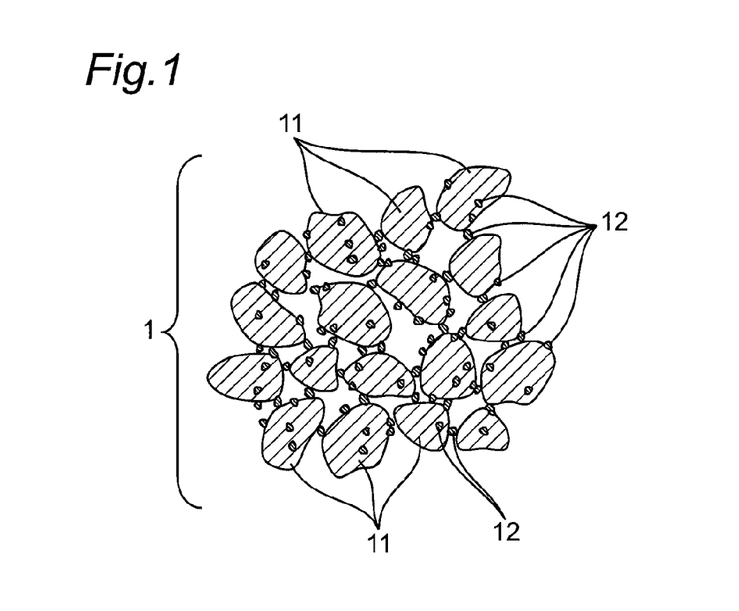
FIG. 1 is a schematic view of a mixture according to a first embodiment.

FIG. 1 is a schematic view of a water repellent sand mixture 1 according to the first embodiment. The water repellent sand mixture 1 includes a large number of particles 11 processed by water repellent treatment and cement 12. Hereinafter, the particles 11 processed by water repellent treatment are also referred to as "water repellent sand".

As shown in FIG. 1, the plurality of particles 11 processed by water repellent treatment are bound to each other by the cement 12.

The water repellent sand mixture 1 includes the cement 12 of a weight ratio of 2% or more and 5% or less relative to the particles 11 processed by water repellent treatment, and thus has water repellency and strength at or above a certain level. Details thereof are to be described later.

<Water Repellent Sand>

An Example of "water repellent sand" is composed of particles having surfaces processed by water repellent treatment.

For example, a particle is processed by water repellent treatment using a water repellent agent including at least one selected from a chlorosilane-based material, an alkoxysilane-based material, a silicone-based material, a fluorine silicone-based material, and an acrylic emulsion-based water repellent agent.

Examples of a chlorosilane-based material include heptadecafluoro-1,1,2,2-tetrahydrodecyltrichlorosilane and n-octadecyldimethylchlorosilane. Examples of an alkoxysilane-based material include n-octadecyltrimethoxysilane and nonafluorohexyltriethoxysilane.

Figure 4:
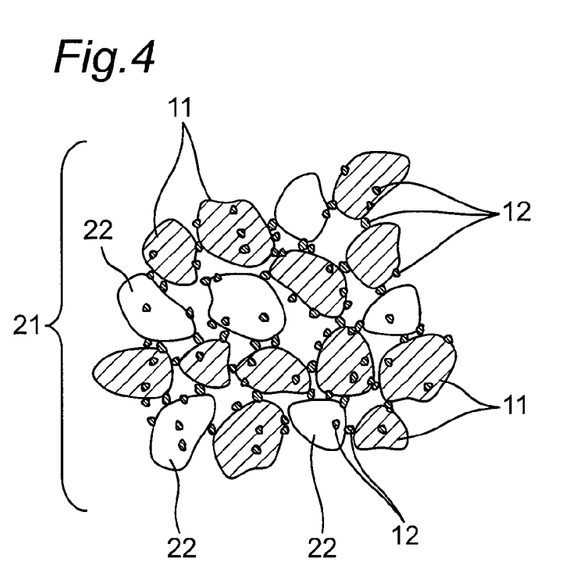
FIG. 4 is a sectional view of a structure according to the first embodiment, the structure further including sand not processed by water repellent treatment.

As shown in FIG. 4, the water repellent sand mixture 1 can optionally include, in addition to the particles 11 processed by water repellent treatment, particles 22 not processed by water repellent treatment to form a water repellent sand mixture 21. When the water repellent sand mixture 21 includes a predetermined or more ratio (weight ratio to be described later) of the water repellent sand 11, the water repellent sand mixture 21 has water repellency and strength at or above a certain level even when including the particles 22 not processed by water repellent treatment.

<Particle>

Examples of particles have an average diameter of 50 μm or more and 500 μm or less.

The water repellent sand particles in this description include gravel, sand, silt, and clay. The gravel includes a particle having a diameter of more than 2 mm and equal to or less than 75 mm. The sand includes a particle having a diameter of more than 0.075 mm and equal to or less than 2 mm. The silt includes a particle having a diameter of more than 0.005 mm and equal to or less than 0.075 mm. The clay includes a particle having a diameter of equal to or less than 0.005 mm.

An example of a particle is made of soil, a glass bead, or the like. The soil includes an inorganic substance, a colloidal inorganic substance, a bulky organic substance, an organic substance generated by alteration such as microbial decomposition, or the like.

Preferred examples of a particle include Toyoura sand (produced by Toyoura Keiseki Kogyo Co., Ltd.). The Toyoura sand has a large weight ratio of particles having diameters of 106 μm or more and 425 μm or less.

<Cement>

The cement includes powder that cures when being mixed with water repellent sand or water. Examples of cement include Portland cement.

(Production Method)

Described below is a method of producing the water repellent sand mixture 1 according to the first embodiment.

<S1: Preparation Step>

Water repellent sand and cement are prepared.

<S2: Mixing Step>

The cement and water are initially mixed to obtain a "mixture of cement and water".

The "mixture of cement and water" thus obtained is then mixed with the water repellent sand to obtain a mixture of the water repellent sand and the "mixture of cement and water". The cement has a weight ratio of 2% or more and 5% or less relative to the water repellent sand.

<S3: Drying Step>

The mixture of the water repellent sand and the "mixture of cement and water" thus obtained is dried in the air to generate a mixture of water repellent sand and cement (i.e. a water repellent sand mixture). The cement has a weight ratio of 2% or more and 5% or less relative to the water repellent sand.

WORKING EXAMPLES

The present disclosure is more specifically described below with reference to the following working examples.

First Working Example

Surfaces of Toyoura sand particles were initially processed by water repellent treatment using (heptadecafluoro-1,1,2,2-tetrahydrodecyl)trichlorosilane and $CF_3 (CF_2)_7 (CH_2)_2 SiCl_3$ to obtain water repellent sand.

Subsequently obtained was a mixture of ordinary Portland cement and water. The water and the cement were mixed at a weight ratio of 1:2. Hereinafter, the mixture of ordinary Portland cement and water is also referred to as a "cement mixture".

It was found that water repellent sand particles having the hydrophobic property were not sufficiently set therebetween when the water repellent sand, cement, and water were mixed uniformly to achieve a weight ratio of about 0.5 between the water and the cement. The weight ratio between the water and the cement was set to 2, out of 0.5, 1, and 2, so as to achieve practical setting of water repellent sand.

The cement mixture and the mixture including the water repellent sand were then mixed to obtain a mixture of water repellent sand and cement. The cement mixture was rubbed into the surfaces of the water repellent sand particles in order to adequately mix the cement mixture and the water repellent sand. Specifically, the cement mixture was rubbed into the surfaces of the water repellent sand particles with a hand. In other words, the cement mixture and the water repellent sand were mixed together such that the particles processed by water repellent treatment and the cement were made in contact with each other at pressure of a predetermined or higher level.

Such a mixing task is performed to mix the particles processed by water repellent treatment and the cement such that the cement applies shear stress to the particles processed by water repellent treatment. The surfaces of the particles processed by water repellent treatment can be thus damaged partially, so that the surfaces of the particles and the cement (cement particles) can be directly bound to each other. In other words, the cement (cement particles) bounded to part of the particles processed by water repellent treatment can bind the plurality of particles processed by water repellent treatment to each other.

Thereafter, the mixture of water repellent sand and cement (i.e. the water repellent sand mixture) was tamped by applying predetermined force. The predetermined force had standard compaction energy (550 kJ/m$^3$) that is defined in the JIS 1210 "Test method for soil tamping using a rammer".

Then, the tamped mixture of water repellent sand and cement was cured for 7 days in the air (in a room having an air temperature of 20±2 (° C.) and a humidity of 50±10(%)).

The mixture thus produced (i.e. the water repellent sand mixture) included cement having a weight ratio of 3% relative to the water repellent sand.

The mixture had a dry density of 1.462 g/cm$^3$ and a moisture content of 0.3. The porosity of the produced mixture was obtained as 43.8% from 2.65 g/cm$^3$ as the particle density of the water repellent sand and 3.13 g/cm$^3$ as the particle density of the cement.

The produced mixture was observed using an optical microscope to find a microscopic structure in which the fine cement particles adhered to the water repellent sand and bind the gaps between the water repellent sand particles.

(Water Repellency Evaluation)

Described below is water repellency evaluation. The produced mixture was cut into a columnar shape having about 2 cm in diameter and about 2 cm in length. The columnar body has flat end surfaces, onto each of which a 3 μL water drop was dripped from an injection needle. Measured was a contact angle, as an apparent contact angle, of the water drop on the flat end surface shifting from a solid-liquid interface to a gas-liquid interface. Such measurement was executed 10 times to obtain 116.4 degrees as an average value of the contact angles.

(Dynamic Stability Evaluation)

Described below is dynamic stability evaluation. Dynamic stability indicates strength of a mixture. A box shear test was executed using the mixture having 6 cm in diameter and 2 cm in height, to measure shear strength, an internal frictional angle, and adhesive force.

The test was executed in accordance with the box shear test on soil (JGS 0560 and 0561). This test was particularly classified into a simplified constant pressure test under an unconsolidated-undrained condition. The test had the results that the internal frictional angle had 34.6 degrees and the adhesive force had 0.0 kN/m$^2$.

The "shear strength" indicates limit strength against shearing, of a raw material, a structure, or the like. The term "internal friction" indicates friction at a slide plane when part of an object shifts along the slide plane inside the object (e.g. when a ground causes landslide). The "internal frictional angle" indicates an angle between a straight line that indicates frictional resistance by the relationship between normal stress (transverse axis) and shear resistance force (ordinate axis), and the transverse axis.

Second Working Example

A test similar to that of the first working example was executed except that cement had a weight ratio of 2% relative to water repellent sand. Table 1 indicates the test results.

Third Working Example

A test similar to that of the first working example was executed except that cement had a weight ratio of 4% relative to water repellent sand. Table 1 indicates the test results.

Fourth Working Example

A test similar to that of the first working example was executed except that cement had a weight ratio of 5% relative to water repellent sand. Table 1 indicates the test results.

Fifth Working Example

A test similar to that of the first working example was executed except that standard sand was added to water repellent sand. Specifically, sand used in the test included water repellent sand and sand not processed by water repellent treatment (standard sand) mixed at a weight ratio of 9:1. Similarly to the first working example, the sand was mixed with cement at an additive rate of 3%, the mixture thus obtained was tamped to reach a dry density of 1.465 g/cm$^3$ like a sample including only water repellent sand and cement at an additive rate of 3%, and was then stabilized.

The test had the result that the produced mixture had a contact angle of 105.1 degrees. The mixture of the fifth working example was found to have the contact angle smaller than the contact angle of 116.4 degrees of the mixture including only water repellent sand and cement at an additive rate of 3%, but have water repellency.

First Comparative Example

A test similar to that of the first working example was executed except that a mixture included no cement.

Water repellent sand of the first comparative example was scattered to adhere flatly onto a double sided tape attached to a glass slide and excessive unfixed water repellent sand was removed to prepare an evaluation sample. The test using a 3 μL water drop failed to achieve measurement of an apparent contact angle. Specifically, the mixture of the first comparative example was likely to collapse so that a columnar sample could not be cut to have about 2 cm in length and no contact angle could be measured.

The mixture was tamped to have a density of 1.463 g/cm$^3$ equal to that of the evaluation sample including cement at an additive rate of 3%, to produce a sample for dynamic stability evaluation. The measurement results of dynamic stability included a porosity of 44.8%, the internal frictional angle of 26.1 degrees, and the adhesive force of 0.0 kN/m$^2$.

Second Comparative Example

A test substantially similar to that of the first working example was executed except that cement had a weight ratio of 1% relative to water repellent sand. Table 1 indicates the test results.

Similarly to the mixture of the first comparative example, no contact angle was measured with the mixture of the second comparative example. When a water drop was made in contact with the mixture of the second comparative example so as to be dripped from an injection needle onto the mixture, the mixture adhered to the water drop itself and the water drop was not dripped (in other words, the mixture was sucked to the water drop at the injection needle and the water drop was not dripped from the injection needle onto the mixture) and no contact angle was not measured.

It was thus found that sand particles did not sufficiently adhere to each other by cement in the mixture including cement at an additive rate of 1% and the water repellent sand was not stabilized sufficiently.

Third Comparative Example

A test similar to that of the first working example was executed except that cement had a weight ratio of 6% relative to water repellent sand. Table 1 indicates the test results.

Fourth Comparative Example

A test similar to that of the first working example was executed except that cement had a weight ratio of 7% relative to water repellent sand. Table 1 indicates the test results.

Fifth Comparative Example

A test similar to that of the first working example was executed except that cement had a weight ratio of 9% relative to water repellent sand. Table 1 indicates the test results.

Sixth Comparative Example

A test similar to that of the first comparative example was executed except that water repellent sand was replaced with sand not processed by water repellent treatment (hereinafter, referred to as "standard sand").

The standard sand of the sixth comparative example allowed a water drop to immediately permeate thereinto and thus exerted no water repellency. The mixture was tamped to have a dry density of 1.463 g/cm$^3$ equal to that of water repellent sand with no cement, to produce a sample for dynamic stability evaluation. The test had the results that the internal frictional angle had 35.1 degrees and the adhesive force had 0.0 kN/m$^2$.

Seventh Comparative Example

A test similar to that of the sixth comparative example was executed except that cement had a weight ratio of 33%. Table 1 indicates the test results.

TABLE 1

|  | Cement additive rate | Dry density (g/cm$^3$) | Porosity (%) | Internal frictional angle (deg.) | Adhesive force (kN/m$^2$) | Contact angle (deg.) |
|---|---|---|---|---|---|---|
| First comparative example | Water repellent sand - cement 0% | 1.463 | 44.8 | 26.1 | 0.0 | Not measured |

TABLE 1-continued

| | Cement additive rate | Dry density (g/cm$^3$) | Porosity (%) | Internal frictional angle (deg.) | Adhesive force (kN/m$^2$) | Contact angle (deg.) |
|---|---|---|---|---|---|---|
| Second comparative example | Water repellent sand - cement 1% | 1.411 | 46.4 | 26.7 | 0.0 | Not measured |
| Second working example | Water repellent sand - cement 2% | 1.415 | 45.9 | 33.2 | 0.0 | 124.5 |
| First working example | Water repellent sand - cement 3% | 1.462 | 43.8 | 34.6 | 0.0 | 116.4 |
| Third working example | Water repellent sand - cement 4% | 1.525 | 41.0 | 40.3 | 0.0 | 114.2 |
| Fourth working example | Water repellent sand - cement 5% | 1.559 | 39.3 | 38.6 | 40.4 | 100.7 |
| Fifth working example | Water repellent sand/standard sand = 9/1 - cement 3% | | | 33.7 | 0.0 | 105.1 |
| Third comparative example | Water repellent sand - cement 6% | 1.494 | 41.5 | 41.2 | 14.9 | Not measured |
| Fourth comparative example | Water repellent sand - cement 7% | 1.615 | 36.3 | 41.4 | 57.7 | Not measured |
| Fifth comparative example | Water repellent sand - cement 9% | | | | | Not measured |
| Sixth comparative example | Standard sand - cement 0% | 1.463 | | 35.1 | 0.0 | Not measured |
| Seventh comparative example | Standard sand - cement 33% | 1.763 | 19.4 | | | Not measured |

The cement has a weight ratio of 2% or more and 5% or less relative to the water repellent sand in each of the mixtures of the first to fifth working examples. The mixtures of the first to fifth working examples each have a contact angle of 90 degrees or more, and an internal frictional angle of a predetermined or more value.

The sand not processed by water repellent treatment (standard sand) has the internal frictional angle of 35.1 degrees whereas the water repellent sand has the internal frictional angle of 26.1 degrees. This indicates that water repellent treatment deteriorates dynamic stability. The internal frictional angle increases in proportion to the additive rate of cement to water repellent sand, and the internal frictional angle had 33.2 degrees at a cement additive rate of 2%. This indicates that dynamic stability of the water repellent sand has recovered to a level similar to that of the standard sand.

The water repellent sand including the cement at an additive rate of 4% has an internal frictional angle larger than that of the standard sand, and is thus found to have dynamically excellent dynamic stability. In an example, cement has a weight ratio of 4% or more and 5% or less relative to water repellent sand.

It was found that a cement additive rate of 5% or more achieves an internal frictional angle of about 40 degrees and exertion of adhesive force, and the mixture serves as an aggregated block with more dynamically stabilized behavior.

As to water repellency, water repellent sand with no cement has the contact angle of 130 degrees to exert excellent water repellency. The larger cement additive rate leads to the smaller contact angle, and a cement additive rate of 6% or more leads to no water repellency. At a cement additive rate of 3%, pure water repellent sand has the contact angle of 116.4 degrees, whereas water repellent sand mixed with 10% of standard sand has the contact angle of 105.1 degrees and keeps water repellency although being lowered.

The water repellent sand mixture 1 according to the first embodiment includes the water repellent sand 11 and the cement 12 that has a weight ratio of 2% or more and 5% or less relative to the water repellent sand 11. This configuration achieves both water repellency and dynamic stability. Specifically, a mixture having a weight ratio within the above range achieves dynamic stability not too deteriorated by water repellent treatment, and serves as an aggregated block with dynamically stabilized behavior, as well as sufficiently exerts water repellency.

Based on the above results, Table 1 indicates additive rates and porosities of cement to water repellent sand, as well as evaluation results of water repellency and dynamic stability. It was also found that a water repellent sand mixture achieving sufficient water repellency and dynamic stability has a porosity of 39% or more and 46% or less.

Water repellent sand made of Toyoura sand as sand particles includes Toyoura sand particles coated with organic molecular moieties. Stabilized condensate of this water repellent sand achieves the properties of both water repellency and dynamic stability.

Such stabilized condensate of the water repellent sand includes the water repellent sand particles adhering to each other by means of cement and thus has a large porosity of 39% or more and 46% or less. This condensate made of the water repellent sand mixture that achieves the properties of both water repellency and dynamic stability, as well as has excellent air permeability, can be provided.

For example, an organic molecule and a particle form an Si—O bonding. An organic molecule bonds with Si and a sand particle bonds with O, so that an organic molecular moiety thus firmly bonds with the sand particle. The organic molecular moiety is unlikely to be detached and water repellency can thus last for a long period of time.

When the organic molecular moiety is composed of a fluorocarbon group and a hydrocarbon group, the organic molecular moiety exerts excellent water repellency. When the organic molecular moiety composed of a fluorocarbon group and a hydrocarbon group is expressed as $CF_3(CF_2)_7(CH_2)_2$—, the organic molecular moiety exerts more excellent water repellency.

The finding as the basis of the present disclosure described below was obtained by the present inventors who have studied the Patent Literatures.

For improvement of farm soil or construction of civil engineering works such as roads and the like, water repellent sand has better water repellency and enables formation into any shapes as compared to a water repellent block. It is, however, difficult to keep the shape of water repellent sand formed into a vertical or slant shape because water repellent sand has small surface friction and easily causes a slide.

Patent Literature 1 discloses concrete to which surface alkyl alkoxysilane is applied using a nonionic emulsifier and an anionic emulsifier. However, this technique relates to surface repellency. The material applied to the surface of the concrete may separate due to aging degradation to expose the surface of the concrete. The concrete may crack due to aging degradation or the like to expose surfaces of the cracked portion. The exposed surfaces will not have water repellency. The concrete according to this technique has a water absorption rate of about 5%, and does not have reliable water repellency.

Patent Literature 2 discloses mortar or a concrete molding product that is produced by mixing an aggregate, cement, water, and the like with a silicone oil. This technique is expected to decrease the water absorption rate to 0.43(%). It will be, however, difficult to wholly and uniformly mix the material of the molded product with the silicone oil serving as a water repellent agent.

Mortar according to Patent Literature 4 and the like, which is composed of sand processed by water repellent treatment using oily silicone and water containing no aqueous solvent, has a water absorption rate of 4% to 5%. The water absorption rate of this mortar is smaller by only 2% to 3% than that of mortar made of sand not processed by water repellent treatment. This water absorption rate is substantially equal to a water absorption rate of about 2% of ordinary sand. This water repellent treatment simply prevents water from permeating into sand particles, and the mortar molded product thus cannot be necessary determined as having the waterproof property. Patent Literature 4 and the like additionally disclose technical development of waterproof mortar having a water absorption rate of 0.5% or more and 2% or less by adding stearate serving as an aqueous solvent in order to improve the waterproof property of the mortar molded product. Patent Literature 3 and the like are characterized by producing a highly strong cement hardened body that includes 50% or more of an aggregate processed by surface treatment using a silane coupling agent and aqueous solution containing an acrylic monomer mixed together. The water repellency of the mortar molded products according to these prior patents is thus considered to be achieved largely by the mixed aqueous solvent rather than the silane coupling agent applied to the surfaces of sand. In other words, these prior patents are not considered to relate to development of a water repellent molded product obtained only through the technique of applying water repellent treatment to sand.

The mixture according to the first embodiment forms condensate having water repellency originated from the water repellent sand as well as reliable dynamic stability that facilitates construction or maintenance work using the water repellent sand as a soil improvement material or a ground material. The mixture will be applicable as a material having the properties necessary for the soil improvement material or the ground material, namely, water repellency, air permeability, solidity, and abrasion resistance. This material is expected to be applicable for improvement of soil prepared for agricultural use or to water utilizing facilities.

The water repellent sand mixture according to the first embodiment includes at least water repellent sand and cement at a weight ratio of 2% or more and 5% or less relative to the water repellent sand. The mixture achieves condensation between the water repellent sand particles by the hydration reaction of the cement, which improves dynamic stability. The mixture can be kept in a block shape due to such improved dynamic stability, water repellency, and less slidable surfaces of the sand particles.

Second Embodiment

The first embodiment describes the water repellent sand mixture 1 including the particles 11 and the cement 12. The second embodiment exemplifies a structure made of the water repellent sand mixture 1 that includes the particles 11 processed by water repellent treatment and the cement 12.

Figure 2:
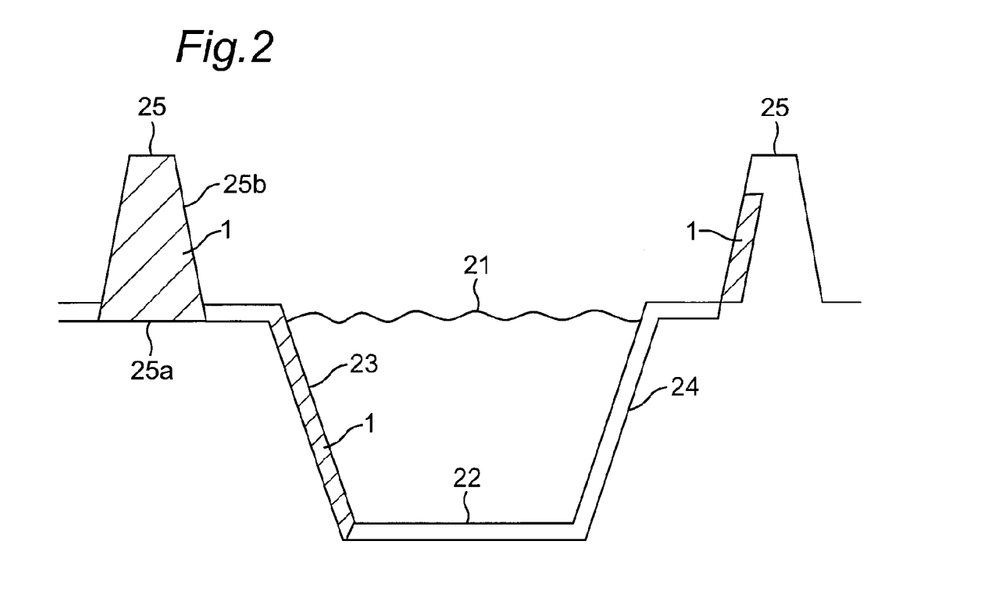
FIG. 2 is a sectional view of a structure according to a second embodiment.

FIG. 2 exemplifies the structure made of the water repellent sand mixture 1 that includes the particles 11 processed by water repellent treatment and the cement 12. FIG. 2 is a sectional view of banks of a river or the like.

FIG. 2 shows the structure including a base bottom portion 22, side surface portions 23 and 24, and banks 25. The side surface portions 23 and 24 each extend slantly upward from the base bottom portion 22. When viewed from a vertical section of the structure shown in FIG. 2, the base bottom portion 22, the side surface portions 23 and 24, and the banks 25 form a concave portion protruding downward. The structure (concave portion) shown in FIG. 2 reserves water and the surfaces of the structure (concave portion) thus have water repellency, for example. The surfaces of the structure (concave portion) include the upper surface of the base bottom portion 22, the upper surfaces of the side surface portions 23 and 24, and the side surfaces of the banks 25 facing the space in the concave portion.

The side surface portion 23 and the banks 25 of the structure according to the second embodiment are at least partially made of the water repellent substance mixture 1 according to the first embodiment. The structure shown in FIG. 2 has shaded portions exemplifying the portions made of the water repellent substance mixture 1 according to the first embodiment.

In order to form at least part of the side surface portion 23 and the banks 25 using the water repellent substance mixture 1 according to the first embodiment, the water repellent substance mixture 1 needs to be formed into a predetermined shape during construction of the structure as well as have water repellency and strength at or above predetermined levels.

Figure 3:
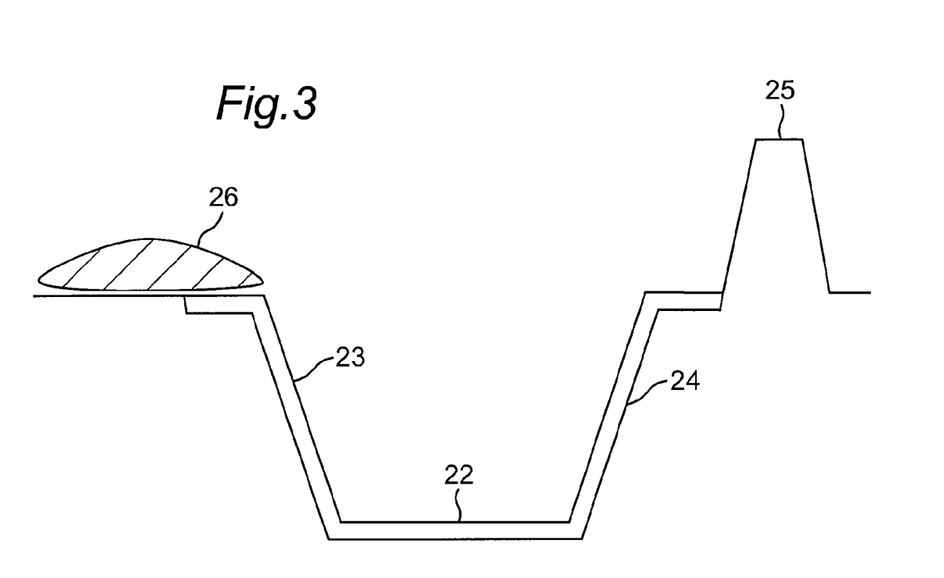
FIG. 3 is a sectional view of a structure according to the second embodiment.

FIG. 3 shows a state before the bank 25 is formed. FIG. 3 shows a material 26 for the bank 25. In a case where the material 26 is water repellent sand not mixed with cement, the material 26 shown in FIG. 3 collapses as described in the "finding" section and is thus hardly formed into the predetermined shape of the bank 25.

Furthermore, the water repellent mixture needs to be formed into different shapes of the base bottom portion 22, the side surface portions 23 and 24, and the banks 25. The mixture needs to have various shapes according to locations of construction. A material such as mortar including cement at a high weight ratio is hardly formed into various shapes.

The water repellent sand mixture 1 according to the first embodiment has water repellency, and strength at or above a predetermined level. The mixture 1 is thus suitable as a material for a standing structure that needs to be formed into different shapes according to locations of construction and has height at or above a certain level. At least part of the side surface portion 23 and the banks 25 (the shaded portions in FIG. 2) can be made of the water repellent substance mixture 1 according to the first embodiment. The side surface portion 23 and the banks 25 can be made only of the water repellent substance mixture 1 according to the first embodiment.

The bank 25 exemplifies a water repellent sand structure that is made only of the water repellent sand mixture 1 according to the first embodiment and stands to have a section in a trapezoidal shape or a rectangular shape with respect to an installation surface. The water repellent sand mixture 1 according to the first embodiment can be planarly spread on a slant surface (e.g. the side surface portion 23), a substantially horizontal surface, or the like so that the water repellent sand is unlikely to be blown by wind or flown by water.

FIGS. 2 and 3 exemplify the structure formed as the banks. The mixture 1 is also applicable to a structure for reserving therein liquid such as water or a structure preventing entrance of liquid such as water.

Figure 5:
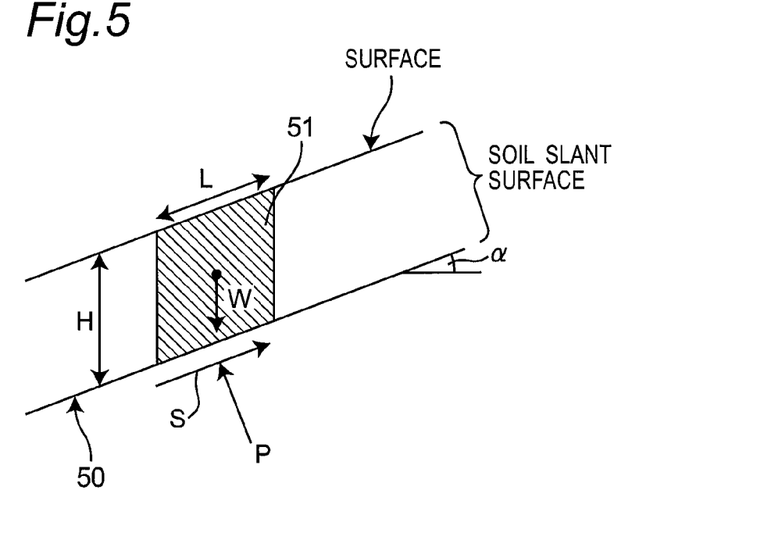
FIG. 5 is an explanatory view on obtaining a slant angle of a case where a slant surface of the structure according to the second embodiment is not fractured.

As one example, with reference to FIG. 5, consideration is made to collapse by a parallel slide, at a slant surface of a structure that is made of the water repellent sand mixture 1. Further consideration can be made to reliability design theory in view of fracture probability distribution with reference to the following calculated values.

Depth from the ground surface to a slip line is denoted by "H", length of a slant surface is denoted by "L", and a slant angle of the slant surface is denoted by "α" (alpha). A virtual slide plane is denoted by 50, shear resistance force of soil mass 51 is denoted by "S", and normal force perpendicular to the shear resistance force S is denoted by "P".

The slide plane has a normal balance obtained by $$P = W \cdot \cos \alpha \quad (1)$$

the slide plane has a parallel balance obtained by $$S = W \cdot \sin \alpha \quad (2)$$

and the following fracture conditional equation is obtained.

$$F = (P \cdot \tan \varphi + c \cdot L)/S \quad (3)$$
$$= \text{(maximum resistance force to fracture)}/$$
$$\text{(force applied to slide plane)}$$

A safety factor is denoted by "F", a soil internal frictional angle (the internal frictional angle in Table 1) is denoted by "φ" (phi), and soil adhesive force (the adhesive force in Table 1) is denoted by "c".

When F≤1 is established, maximum resistance force against fracture is equal to or less than the force applied to the slide plane. The structure is to be fractured in this case.

When F>1 is established, enough maximum resistance force against fracture is more than the force applied to the slide plane. The structure is not to be fractured in this case.

Thus, the following equation is obtained by substituting the equations (1) and (2) into the equation (3).

$$F = (W \cdot \cos \alpha \cdot \tan \varphi + c \cdot L)/(W \cdot \sin \alpha) \quad (4)$$
$$= (\tan \varphi / \tan \alpha) + (c \cdot L/W \cdot \sin \alpha)$$

Assuming that weight per unit volume of the soil mass is denoted by "γ" (gamma) (=the internal frictional angle in Table 1×9.81), soil mass weight (own weight of soil mass) W is expressed as follows using the length L of the slant surface.

$$W = \gamma \cdot H \cdot L \cdot \cos \alpha \quad (5)$$

In this case, assume that 1 gf/cm$^3$=9.81 kN/m$^3$ is established.

The following equation is obtained by substituting the equation (5) into the equation (4).

$$F = (\tan \varphi / \tan \alpha) + \{c \cdot L / (\gamma \cdot H \cdot L \cdot \cos \alpha \cdot \sin \alpha)\} \quad (6)$$
$$= (\tan \varphi / \tan \alpha) + \{c / (\gamma \cdot H \cdot \cos \alpha \cdot \sin \alpha)\}$$
$$= \text{(internal frictional angle)} + \text{(adhesive force)}$$

Obtained below is a maximum slant surface angle considered to cause no fracture in a case of using a shear strength constant for a layer of water repellent sand including cement and made of the water repellent sand mixture 1.

(a) When the cement additive rate (the weight ratio of cement to water repellent sand) is 2%, the following values are obtained.

φ=33.2°, c=0 (kN/m$^2$), γ=14.6 (kN/m$^3$)

The layer is fractured when F=1 is established in the equation (6). These values are substituted into the equation (6) to obtain the following equation.

$$F = 1 = (\tan 33.2°/\tan \alpha) + \{0/(14.6 \cdot H \cdot \cos \alpha \cdot \sin \alpha)\}$$

The angle of the slant surface=the internal frictional angle is established because c=0 is applicable. The slant angle α=33.2° is thus obtained.

In short, if the layer of water repellent sand including cement and made of the water repellent sand mixture 1 is slanted at the slant angle α of about 33 degrees, the layer is not to be fractured.

(b) When the cement additive rate (the weight ratio of cement to water repellent sand) is 34% or 4%, φ=34.6° or φ=40.3° is established, respectively.

In each of these cases, c=0 (kN/m$^2$) is applicable.

Similarly to the case (a), the angle of the slant surface=the internal frictional angle is established because c=0 is applicable. The slant angle α=34.6° or α=40.3° is thus obtained, respectively.

In short, when the layer of water repellent sand including cement at 3% and made of the water repellent sand mixture 1 is slanted at the slant angle α of about 34 degrees, the layer is not to be fractured. When the layer of water repellent sand including cement at 4% and made of the water repellent sand mixture 1 is slanted at the slant angle α of about 40 degrees, the layer is not to be fractured.

(c) When the cement additive rate (the weight ratio of cement to water repellent sand) is 5%, the layer has adhesive force and is less likely to fracture because the safety factor F is increased in the second item of the right side of the equation (6).

The values φ=38.6°, c=40.4 (kN/m$^2$), and γ=15.29 (kN/m$^3$) are obtained in this case.

The depth H is varied by the thickness of the layer of water repellent sand including cement. The depth H is included in the denominator. The safety factor F is thus decreased and the layer is more likely to fracture as the thickness of the layer of water repellent sand including cement is increased.

These values are substituted into the equation (6) to obtain the following equation.

$$F = 1 = (\tan 38.6°/\tan \alpha) + 40.4/(15.29 \cdot H \cdot \cos \alpha \cdot \sin \alpha) \quad (7)$$

The values in Table 2 are obtained from the equation (7).

TABLE 2

| H(m) | α(°) (F = 1) |
|---|---|
| 30 | 44.10028477 |
| 20 | 47.36872153 |

TABLE 2-continued

| H(m) | α(°) (F = 1) |
|---|---|
| 15 | 51.32720575 |
| 12 | 57.03786107 |
| 11 | 63.25100339 |
| 10 | — |

The equation (7) indicates that the layer of water repellent sand including cement and having the thickness of 10 m has a slant surface angle of more than 90 degrees and is thus not to be fractured even when forming a vertical wall.

An example of the water repellent sand structure 25 not to be fractured is made of the mixture 1 of the water repellent sand 11 and the cement 12 and has a lower surface 25a and a side surface 25b. The cement 12 has a weight ratio of 2% or more and 4% or less relative to the water repellent sand 11. When the weight ratio relative to the water repellent sand 11 is denoted by "x", α=33.2 is established when x=2, α=34.6 is established when x=3, and α=40.3 is established when x=4. The lower surface 25a and the side surface 25b can form an angle "y" that satisfies the following approximate equation established on the basis of these values:

$$0<y\leq 2.15x^2-9.35x+43.3$$

Another example of the water repellent sand structure 25 not to be fractured is made of the mixture 1 of the water repellent sand 11 and the cement 12 and has the lower surface 25a and the side surface 25b. The cement 12 has a weight ratio of 5% or less (as well as of 2% or more) relative to the water repellent sand 11. When the structure is 10 m or less or is more than 10 m in height, the lower surface 25a and the side surface 25b can form the angle y satisfying $0<y\leq 1.08h^2-30.99h+273.81$, when the height of the structure is denoted by h.

By properly combining the arbitrary embodiment(s) or modification example(s) of the aforementioned various embodiments and modification examples, the effects possessed by the embodiment(s) or modification example s) can be produced.

The entire disclosure of Japanese Patent Application No. 2012-209205 filed on Sep. 24, 2012, including specification, claims, drawings, and summary are incorporated herein by reference in its entirety.

INDUSTRIAL APPLICABILITY

The water repellent sand mixture and the water repellent sand structure according to the present disclosure each have water repellency, and strength at or above a certain level, and are applicable for improvement of soil prepared for agricultural use or to water utilizing facilities.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A water repellent sand mixture comprising water repellent sand and cement,
wherein the cement has a weight ratio of 2% or more and 5% or less relative to the water repellent sand.

2. The water repellent sand mixture according to claim 1, wherein the water repellent sand composed of particles having surfaces processed by water repellent treatment, and the water repellent sand particles have an average diameter of 50 μm or more and 500 μm or less.

3. The water repellent sand mixture according to claim 1, further comprising:
sand not processed by water repellent treatment.

4. The water repellent sand mixture according to claim 2, further comprising:
sand not processed by water repellent treatment.

5. The water repellent sand mixture according to claim 1, wherein the mixture has a porosity of 39% or more and 46% or less.

6. The water repellent sand mixture according to claim 2, wherein the mixture has a porosity of 39% or more and 46% or less.

7. The water repellent sand mixture according to claim 3, wherein the mixture has a porosity of 39% or more and 46% or less.

8. The water repellent sand mixture according to claim 4, wherein the mixture has a porosity of 39% or more and 46% or less.

9. The water repellent sand mixture according to claim 1, wherein the cement is located between the water repellent sand particles and binds the water repellent sand particles to each other.

10. The water repellent sand mixture according to claim 2, wherein the cement is located between the water repellent sand particles and binds the water repellent sand particles to each other.

11. The water repellent sand mixture according to claim 3, wherein the cement is located between the water repellent sand particles and binds the water repellent sand particles to each other.

12. The water repellent sand mixture according to claim 5, wherein the cement is located between the water repellent sand particles and binds the water repellent sand particles to each other.

13. A water repellent sand structure composed of the water repellent sand mixture according to claim 1,
wherein the structure stands from an installation surface.

14. A water repellent sand structure composed of the water repellent sand mixture according to claim 2,
wherein the structure stands from an installation surface.

15. A water repellent sand structure composed of the water repellent sand mixture according to claim 3,
wherein the structure stands from an installation surface.

16. A water repellent sand structure composed of the water repellent sand mixture according to claim 5,
wherein the structure stands from an installation surface.

17. A water repellent sand structure having a lower surface and a side surface, wherein
the structure is composed of a mixture of water repellent sand and cement,
the cement has a weight ratio of 2% or more and 4% or less relative to the water repellent sand, and
when the weight ratio relative to the water repellent sand is denoted by x and an angle formed between the lower surface and the side surface is denoted by y, the angle y satisfies $$0<y\leq 2.15x^2-9.35x+43.3.$$

18. A water repellent sand structure having a lower surface and a side surface, wherein
the structure is composed of a mixture of water repellent sand and cement,
the cement has a weight ratio of 2% or more and 5% or less relative to the water repellent sand, and when the structure is 10 m or less in height or is more than 10 m in height, a height of the structure is denoted by h, and an angle formed between the lower surface and the side surface is denoted by y, the angle y satisfies $$0<y\leq 1.08h^2-30.99h+273.81.$$

19. The water repellent sand mixture according to claim 1, wherein at least a portion of the cement is directly bound to the water repellent sand.

* * * * *